(12) United States Patent
Lee

(10) Patent No.: US 9,124,379 B2
(45) Date of Patent: *Sep. 1, 2015

(54) METHODS AND APPARATUS TO ADJUST SIGNATURE MATCHING RESULTS FOR AUDIENCE MEASUREMENT

(75) Inventor: Morris Lee, Palm Harbor, FL (US)

(73) Assignee: The Nielsen Company (US), LLC, New York, NY (US)

(*) Notice: Subject to any disclaimer, the term of this patent is extended or adjusted under 35 U.S.C. 154(b) by 467 days.

This patent is subject to a terminal disclaimer.

(21) Appl. No.: 13/557,989

(22) Filed: Jul. 25, 2012

(65) Prior Publication Data

US 2012/0304212 A1 Nov. 29, 2012

Related U.S. Application Data

(63) Continuation of application No. 12/576,811, filed on Oct. 9, 2009, now Pat. No. 8,245,249.

(51) Int. Cl.
*H04H 60/58* (2008.01)
*H04H 60/45* (2008.01)
*H04H 60/37* (2008.01)
(Continued)

(52) U.S. Cl.
CPC ............ *H04H 60/45* (2013.01); *H04H 60/372* (2013.01); *H04H 60/46* (2013.01); *H04H 60/58* (2013.01); *H04H 60/59* (2013.01); *H04N 21/44008* (2013.01); *H04N 21/44204* (2013.01); *H04N 21/44222* (2013.01); *H04N 21/44231* (2013.01)

(58) Field of Classification Search
CPC ..... H04H 60/58; H04H 60/59; H04H 60/372; H04N 21/44222; H04N 21/44231; H04N 21/44008; H04N 21/44204
See application file for complete search history.

(56) References Cited

U.S. PATENT DOCUMENTS 4,450,531 A 5/1984 Kenyon et al.
4,677,466 A 6/1987 Lert, Jr. et al.
(Continued)

FOREIGN PATENT DOCUMENTS

WO 2007120518 10/2007
WO 2007146876 12/2007
WO 2009023842 2/2009

OTHER PUBLICATIONS

IP Australia, "Exam Report," issued in connection with Australian Patent Application No. 2010224460, on May 28, 2012, 3 pages.
(Continued)

*Primary Examiner* — Robert Hance
(74) *Attorney, Agent, or Firm* — Hanley, Flight & Zimmerman, LLC

(57) ABSTRACT

Methods and apparatus to adjust signature matching results for audience measurement are disclosed. An example method to adjust a signature matching result associated with monitoring a media presentation disclosed herein comprises obtaining, from a monitoring device, an audio signature representative of the monitored media presentation, obtaining, from the monitoring device, an environmental characteristic associated with the audio signature, and adjusting the signature matching result using an adjustment value when the audio signature is determined to match a reference signature representative of reference media, the adjustment value being selected from a plurality of adjustment values based on the matched reference signature and the environmental characteristic.

19 Claims, 10 Drawing Sheets

(51) Int. Cl.
　　*H04N 21/442*　　(2011.01)
　　*H04N 21/44*　　(2011.01)
　　*H04H 60/59*　　(2008.01)
　　*H04H 60/46*　　(2008.01)

(56) References Cited

U.S. PATENT DOCUMENTS

| | | | |
|---|---|---|---|
| 5,436,653 | A | 7/1995 | Ellis et al. |
| 5,481,294 | A * | 1/1996 | Thomas et al. ............... 725/20 |
| 5,612,729 | A | 3/1997 | Ellis et al. |
| 5,621,454 | A | 4/1997 | Ellis et al. |
| 6,100,941 | A | 8/2000 | Dimitrova et al. |
| 6,272,176 | B1 | 8/2001 | Srinivasan |
| 6,718,551 | B1 | 4/2004 | Swix et al. |
| 6,968,564 | B1 | 11/2005 | Srinivasan |
| 7,194,752 | B1 | 3/2007 | Kenyon et al. |
| 7,228,275 | B1 * | 6/2007 | Endo et al. ................... 704/235 |
| 7,415,129 | B2 * | 8/2008 | Rhoads ....................... 382/100 |
| 7,460,684 | B2 | 12/2008 | Srinivasan |
| 8,245,249 | B2 | 8/2012 | Lee |
| 2003/0086341 | A1 | 5/2003 | Wells et al. |
| 2004/0064319 | A1 | 4/2004 | Neuhauser et al. |
| 2005/0049860 | A1 * | 3/2005 | Junqua et al. ................ 704/231 |
| 2005/0232411 | A1 | 10/2005 | Srinivasan et al. |
| 2006/0041480 | A1 | 2/2006 | Briggs |
| 2006/0153296 | A1 | 7/2006 | Deng |
| 2006/0184961 | A1 | 8/2006 | Lee et al. |
| 2006/0195861 | A1 | 8/2006 | Lee |
| 2006/0224447 | A1 | 10/2006 | Koningstein |
| 2007/0033608 | A1 | 2/2007 | Eigeldinger |
| 2007/0143778 | A1 * | 6/2007 | Covell et al. ................. 725/19 |
| 2007/0186227 | A1 | 8/2007 | Vanheuverzwyn |
| 2007/0271590 | A1 | 11/2007 | Gulas et al. |
| 2007/0274537 | A1 | 11/2007 | Srinivasan |
| 2008/0091288 | A1 | 4/2008 | Srinivasan |
| 2008/0276265 | A1 | 11/2008 | Topchy et al. |

OTHER PUBLICATIONS

IP Australia, "Exam Report No. 2," issued in connection with Australian Patent Application No. 2010224460, on Jun. 26, 2013, 3 pages.

IP Australia, "Notice of Acceptance," issued in connection with Australian Patent Application No. 2010224460, on Jan. 3, 2014, 2 pages.

IP Australia, "Exam Report," issued in connection with Australian Patent Application No. 2013203704, on Sep. 26, 2013, 3 pages.

Canadian Intellectual Property Office, "Office Action," issued in connection with Canadian Patent Application No. 2,717,232, on Mar. 26, 2013, 3 pages.

European Patent Office, "Extended European Search Report," issued in connection with European Patent Application No. 10013428.7, on Dec. 20, 2012, 6 pages.

United States Patent and Trademark Office, "Notice of Allowance," issued in connection with U.S. Appl. No. 12/576,811, on Apr. 10, 2012, 19 pages.

United States Patent and Trademark Office, "Supplemental Notice of Allowability," issued in connection with U.S. Appl. No. 12/576,811, on Jul. 19, 2012, 2 pages.

Canadian Intellectual Property Office, "Office Action", issued in connection with Canadian Patent Application No. 2,717,232, dated May 5, 2014 (2 pages).

IP Australia, "Patent Examination Report No. 2", issued in connection with Australian Patent Application No. 2013203704, dated Oct. 28, 2014 (3 pages).

IP Australia, "Notice of Acceptance", issued in connection with Australian Patent Application No. 2013203704, dated Jan. 6, 2015 (2 pages).

Canadian Intellectual Proprety Office, "Notice of Allowance", issued in connection with Canadian Patent Application No. 2,717,232, dated Jul. 9, 2015 (1 page).

* cited by examiner

| CONTENT ID # | CHARACTERISTIC | CHARACTERISTIC VALUE | SIGS GEN'D | SIGS MATCHED | RATIO |
|---|---|---|---|---|---|
| 1 | (Volume, Noise) | (30 dB, 20 dB) | 10 | 7 | 0.7 |
| 1 | (Volume, Noise) | (35 dB, 20 dB) | 10 | 8 | 0.8 |
| 1 | (Volume, Noise) | (40 dB, 20 dB) | 10 | 9 | 0.9 |
| 1 | (Volume, Noise) | (30 dB, 30 dB) | 10 | 6 | 0.6 |
| 1 | (Volume, Noise) | (30 dB, 35 dB) | 10 | 5 | 0.5 |
| 1 | (Volume, Noise) | (30 dB, 40 dB) | 10 | 4 | 0.4 |
| 2 | (Volume, Noise) | (30 dB, 20 dB) | 10 | 6 | 0.6 |
| 2 | (Volume, Noise) | (35 dB, 20 dB) | 10 | 7 | 0.7 |
| 2 | (Volume, Noise) | (40 dB, 20 dB) | 10 | 8 | 0.8 |
| 2 | (Volume, Noise) | (30 dB, 30 dB) | 10 | 5 | 0.5 |
| 2 | (Volume, Noise) | (30 dB, 35 dB) | 10 | 4 | 0.4 |
| 2 | (Volume, Noise) | (30 dB, 40 dB) | 10 | 3 | 0.3 |

| CONTENT CATEGORIES BY SIGNATURE MATCHING RATE |
|---|
| A: ≥ 0.91 |
| B: ≥ 0.87 & < 0.91 |
| C: ≥ 0.85 & < 0.87 |
| D: ≥ 0.80 & < 0.85 |
| E: ≥ 0.70 & < 0.80 |
| F: ≥ 0.60 & < 0.70 |
| G < 0.60 |

Highest Matching Rate → A
Lowest Matching Rate → G

| SCALING FACTORS NORMALIZING TO CATEGORY A |
|---|
| A = 1.00 |
| B = 1.04 |
| C = 1.07 |
| D = 1.14 |
| E = 1.30 |
| F = 1.52 |
| G > 1.52 |

| SCALING FACTORS NORMALIZING TO 100% |
|---|
| A = 1.10 |
| B = 1.15 |
| C = 1.18 |
| D = 1.25 |
| E = 1.43 |
| F = 1.67 |
| G > 1.67 |

FIG. 6C

METHODS AND APPARATUS TO ADJUST SIGNATURE MATCHING RESULTS FOR AUDIENCE MEASUREMENT

RELATED APPLICATION(S)

This patent is a continuation of U.S. patent application Ser. No. 12/576,811, entitled "Methods and Apparatus to Adjust Signature Matching Results for Audience Measurement," which was filed on Oct. 9, 2009. U.S. patent application Ser. No. 12/576,811 is hereby incorporated by reference in its entirety.

FIELD OF THE DISCLOSURE

The present disclosure relates generally to audience measurement and, more particularly, to methods and apparatus to adjust signature matching results for audience measurement.

BACKGROUND

Consuming media presentations (e.g., audio and/or video presentations) generally involves listening to audio information and/or viewing video information. Media presentations may include, for example, radio programs, music, television programs, radio or television commercials, movies, still images, etc. Media-centric companies such as, for example, advertising companies, broadcast networks, media researchers, etc., are often interested in determining the viewing and/or listening interests of audience members to better market their products and/or to improve their programming Ascertaining such viewing and/or listening habits often involves determining which media content was presented to the audience members.

Audience monitoring devices, such as site meters, tags, portable personal meters, etc., can be used to automatically determine which media content is being presented by a media device. Such monitoring devices are typically configured to monitor presentation of media content (e.g., from which viewing and/or listening activities can be inferred) by determining an identity, or certain attributes, of the media content being presented. For example, one technique of determining which media content is being presented to an audience member involves determining (e.g., generating) monitored signatures representative of the audio and/or video signals output by a monitored media presentation device (e.g., such as the output of one or more televisions, stereos, speakers, set top boxes, computers, video display devices, video games, mobile telephones, etc.) and comparing each determined monitored signature to one or more reference signatures corresponding to known (e.g., reference) media content. A successful match between a monitored signature and a reference signature indicates that the monitored media content may correspond to the particular reference media content represented by the matching reference signature. However, under some operating conditions, the monitored signature and the reference signature may not match even though the monitored media content corresponds to the particular reference media content represented by the unmatched reference signature.

BRIEF DESCRIPTION OF THE DRAWINGS

FIG. 5 is a portion of an example signature matching result table for use by the example signature tester of FIGS. 2 and/or 3.

FIGS. 6A through 6C illustrate example signature matching result adjustment values determined by the example signature tester of FIGS. 2 and/or 3.

DETAILED DESCRIPTION

Figure 1:
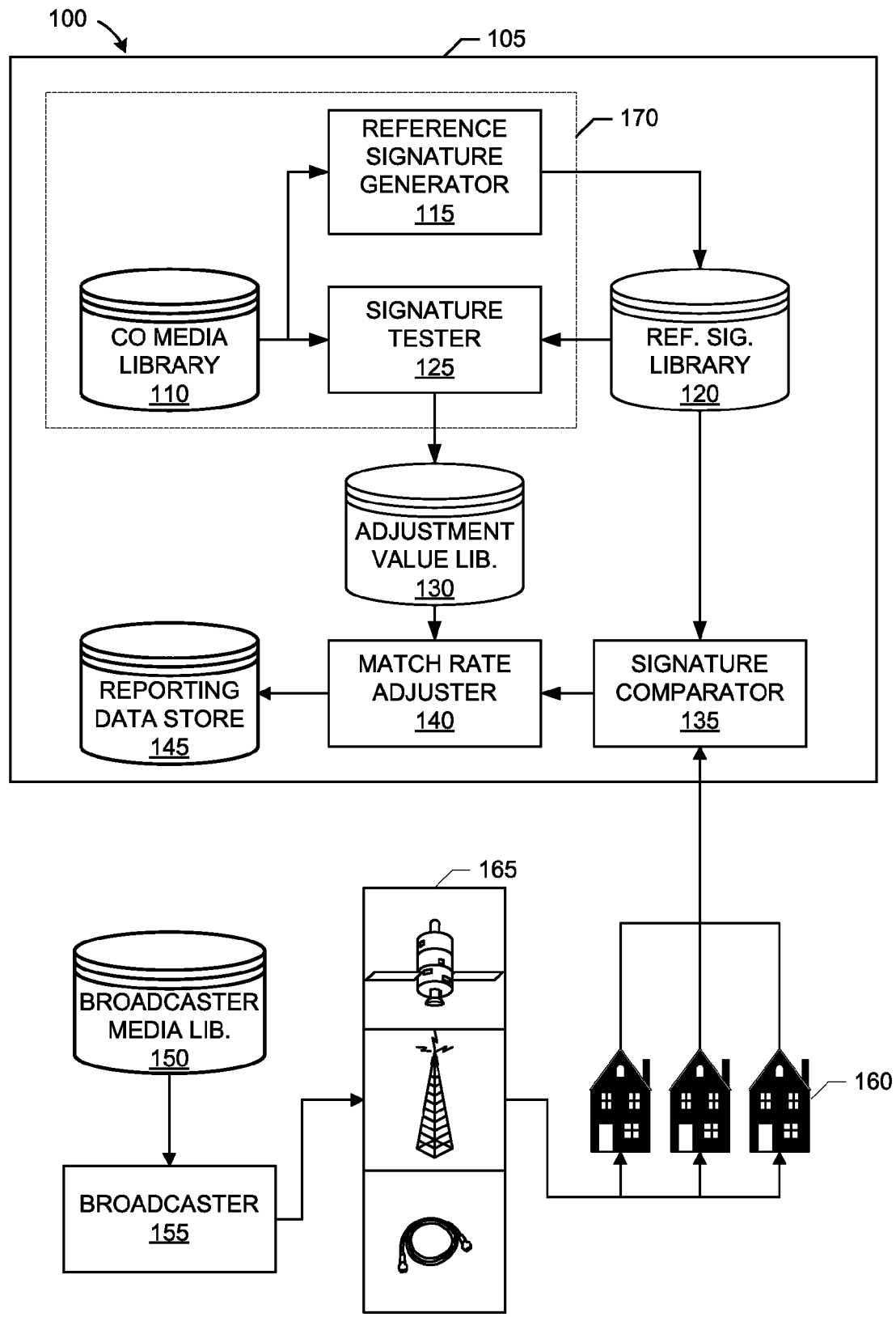
FIG. 1 is a block diagram of an example system to adjust signature matching results to facilitate audience measurement.

Methods and apparatus to adjust signature matching results to facilitate content identification for audience measurement are disclosed herein. Unlike content identification techniques based on codes and/or watermarks included with and/or embedded in media content, signature-based content identification techniques generally use one or more inherent characteristics of the presented media content to generate a substantially unique proxy for the media content. Such a proxy is also referred to as a signature, and can take the form of a series of digital values, a waveform, etc., representative of the media content. A good signature is usually one that is repeatable when processing the same media content, but that is unique when processing other media content.

A typical signaturing technique for identifying monitored media content presentations involves determining (e.g., generating) a monitored signature representative of a media signal (e.g., an audio signal and/or a video signal) output by a monitored media presentation device and comparing the monitored signature to one or more references signatures corresponding to known (e.g., reference) media content sources. Various comparison criteria, such as a cross-correlation value, a Hamming distance, etc., can be evaluated to determine whether the monitored signature matches a particular reference signature. When a substantial match between the monitored signature and one of the reference signatures is found, the monitored program content can be identified as corresponding to the particular reference media content source represented by the reference signature that substantially matched the monitored signature. Because attributes, such as content identity, presentation time, broadcast channel, etc., are collected for the reference signature, these attributes may then be associated with the matching monitored signature.

As noted above, although a particular segment of the monitored media content may correspond to a particular reference content source, under some circumstances the monitored signature may not match any reference signature representative of that reference content source. Any number of factors, such as, for example, ambient noise conditions or the type of media content from which the monitored and/or reference signatures are generated, may influence whether a particular monitored signature is determined to match a reference signature representative of the reference content source corresponding to the monitored media content. As such, although the monitored media content may correspond to the particular reference content source, during a given measurement time interval the actual number of signature matches between monitored and reference signatures corresponding to the same content occurring may be less than the number of signature comparisons performed. In other words, monitored and reference signatures corresponding to the same content may not always yield a match depending upon the environmental characteristics existing when the monitored and/or reference signatures are determined (e.g., generated).

To compensate for such signature matching inaccuracy, an example method to adjust a signature matching result associated with monitoring a media content presentation described herein involves obtaining a monitored signature representative of the monitored media content presentation from a monitoring device. The example method also involves obtaining one or more environmental characteristics associated with the monitored signature from the monitoring device. Furthermore, the example method involves adjusting the signature matching result using an adjustment value when the monitored signature is determined to match a reference signature representative of reference media content, with the adjustment value being selected from a plurality of adjustment values based on the matched reference signature and the one or more environmental characteristic.

As another example, an article of manufacture is described herein as storing machine readable instructions which, when executed, cause a machine to obtain a monitored signature representative of a monitored media content presentation from a monitoring device. In such an example, the machine readable instructions, when executed, also cause the machine to obtain an environmental characteristic associated with the monitored signature from the monitoring device. Further, such machine readable instructions, when executed, cause the machine to adjust a signature matching result using an adjustment value when the monitored signature is determined to match a reference signature representative of reference media content, the adjustment value selected from a plurality of adjustment values based on the matched reference signature and the environmental characteristic.

As yet another example, an apparatus to adjust a signature matching rate associated with monitoring a media content presentation is described herein as including a signature comparator to obtain a first monitored signature representative of the monitored media content presentation from a monitoring device. In the example apparatus, the signature comparator is also to compare the first monitored signature with a plurality of reference signatures representative of a plurality of reference content sources. Additionally, the example apparatus includes a match rate adjuster to adjust the signature matching rate using a first adjustment value when the first monitored signature is determined to match a first reference signature representative of a first reference content source from the plurality of reference content sources. In an example implementation, the signature matching rate is representative of a frequency with which reference signatures representative of a first reference media content are successfully matched during a measurement time interval. Furthermore, in an example implementation, the first adjustment value is selected based on the matched first reference signature and a first environmental characteristic associated with first monitored signature, with the first environmental characteristic being obtained from the monitoring device.

Turning to the figures, an example system 100 to adjust signature matching results to facilitate audience measurement is shown in FIG. 1. Audience measurement entities may employ any of a variety of signature-based media content identification techniques to determine whether a monitored audience member has been exposed to a particular media content presentation and, if so, to identify the media content. Media content presentations of interest can include, for example, one or more television and/or radio programs, advertisements (e.g., such as commercials), and/or any other type of media broadcast, online content, etc. A monitored audience member can be, for example, a person located at a monitored site (e.g., such as a monitored household), a person carrying a personal/portable meter equipped to determine (e.g., generate) and collect signatures representative of detected media content in the vicinity of the person, etc.

In an example signature-based media content identification technique employed by the system 100, signatures representative of monitored media content are collected during some measurement time interval. Such monitored signatures may be spaced equally in time (e.g., such as when signatures are generated based on a measurement sampling interval) or spaced unequally in time (e.g., such as when signatures are generated based on occurrences of certain events). An audience measurement entity collects the monitored signatures for comparison with reference signatures representative of known (e.g., reference) media content sources. When a substantial match is found, the monitored program content can be identified as corresponding to the particular reference media content source having reference signatures that substantially matched at least some of the monitored signatures. In at least some example implementations, for a particular measurement interval, the number of monitored signatures matching respective reference signatures for this particular reference media content source are counted (e.g., summed) to determine whether the monitored audience member was sufficiently exposed to the monitored media content presentation to consider such media content as having been consumed. However, because a signature is generated based on the inherent characteristics of the media content, the likelihood of successfully matching monitored and reference signatures corresponding to the same media content can depend on the monitoring environment in which the monitored signatures are generated, as well as the inherent characteristics of the media content itself. The example system 100 compensates for such variations in signature matching accuracy by determining signature matching adjustment values that can be used to equalize signature matching accuracy across different media content and monitoring environments.

Referring to FIG. 1, the example system 100 includes a central office 105, which includes a central office media library 110, a reference signature generator 115, a reference signature library 120, a signature tester 125, an adjustment value library 130, a signature comparator 135, a match rate adjuster 140 and a reporting data store 145. The example system 100 of FIG. 1 also includes a broadcast media library 150, and a broadcaster 155 that transmits media content to monitored sites 160 (e.g., such as one or more monitored households) via one or more transmission routes 165. The transmission routes 165 may include, but are not limited to, radio frequency (RF) transmission, Internet transmission, wireless (e.g., cellular) transmission, cable transmission, and/ or satellite transmission. The central office (CO) media library 110 stores one or more types of reference media programming provided by an entity (e.g., a broadcaster, a marketing entity, a manufacturer, a merchant, etc.) interested in audience behavior information. Such audience behavior information may include viewer identity, demographics, tuned broadcast programming channels, tuned movies, tuned advertisements, ambient conditions of the audience, audio/visual (A/V) channel and/or volume changes, to name a few. The reference media programming may be received by the CO media library 110 in real-time when the media programming is broadcast or otherwise provided to the audience, and/or prior to being broadcast or otherwise provided to the audience.

Generally speaking, the marketing entity, broadcaster, and/or other entity interested in advertisement effectiveness and/or interested in determining media content exposure looks to an audience measurement entity to capture and provide such information. The audience measurement entity employs audience measurement equipment to determine whether media content is exposed to and/or consumed by audience members at monitored sites (e.g., such as households that are statistically selected to represent one or more population segments of interest). For example, media content (e.g., television programs, radio programs, advertisements, etc.) that draws a large audience may demand higher payments for advertising time than media content that has a smaller audience. Similarly, advertisement effectiveness (or reach) may be determined, in part, by determining how many times the advertisement is presented in a household as detected by audience measurement equipment.

Audience measurement equipment employing signature-based content identification techniques at monitored locations (e.g., such as the monitored sites 160) generate signatures representative of media content (e.g., such as a tuned program and/or advertisement) presented via any type of monitored media device (e.g., such as any type of television, radio, computer, mobile device, etc.). The example system 100 is compatible with any type of signature generation technique. Examples of signaturing techniques that can be used in the example system 100 include, but are not limited to, any or all of the techniques described in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008, all of which are hereby incorporated by reference in their respective entireties.

To perform content identification, the example CO 105 includes the reference signature generator 115 to generate one or more reference signatures for each reference media content source to be considered for program identification. In the illustrated example, the reference content sources take the form of reference media content stored in the CO media library 110. For example, the CO media library 110 can be implemented using any type of storage technology, such as any type of memory, database, etc., for storing reference media content according to any appropriate format. The reference content stored in the CO media library 110 corresponds to some or all of the content available via the broadcaster media library 150. The reference signature generator 115 implements any appropriate signature generation technique to generate the reference signature(s) representative of the reference content stored in the CO media library 110 and stores the generated reference signature(s) in the reference signature library 120. The reference signature library 120 can be implemented using any type of storage technology, such as any type of memory, database, etc., for storing reference signatures according to any appropriate format (e.g., such as data files, waveforms, bitmaps, etc.).

The CO 105 of the example system 100 receives monitored signatures collected at the monitored sites 160 and representative of monitored media content. The signature comparator 135 included in the CO 105 compares the received monitored signatures with the references signatures stored in the reference signature library 120. Any appropriate technique for comparing signatures, such as techniques employing correlation, pattern matching, error calculation, etc., can be used by the signature comparator 135 to compare monitored and reference signatures.

Generally, a signature is a unique proxy for the underlying media content the signature represents. As such, a successful match between a monitored signature and a reference signature is a good indication that the monitored media content and the reference media content represented by the matching monitored and reference signatures are the same. However, signature matching accuracy depends on several factors, including, but not limited to, the inherent characteristics of the audio and/or video signals presenting media content, the characteristics of the ambient environment in which the media content is presented, etc. For example, the ability of a particular signature to uniquely represent its corresponding media content depends on whether the inherent characteristics (e.g., such as frequencies, zero crossings, etc.) of the content's media signal(s) are sufficiently unique to result in a unique signature. If the inherent characteristics of the media signal(s) do not result in a unique signature, a monitored signature generated for such content may match reference signatures for multiple different reference content sources, thereby preventing the monitored media content from being identified as corresponding to one particular reference content source. As another example, the ambient conditions of the monitored environment (e.g., such as ambient noise, ambient light, etc.) and/or the A/V capabilities of the media device in the monitored environment may introduce error into the monitored signatures produced in the monitored environment. As a result, the monitored signatures generated for media content presented by A/V equipment (e.g., a television, a radio, etc.) in an audience member's household may not successfully match corresponding reference signatures because of ambient noise conditions, the audio spectral capabilities of the A/V equipment, etc.

In the illustrated example, a marketing entity, broadcaster, and/or other entity interested in determining whether audience members are exposed to media content provides such reference media content (e.g., one or more advertisements, portions of advertisements, portions of movies, portions of sitcoms, etc.) to the CO 105 for testing to determine the reference media content's signature matching characteristics. For example, the reference media content provided to the CO 105 is stored in the CO media library 110 and subsequently tested to determine whether and to what extent reference signatures representative of the reference content are determined to match corresponding simulated monitored signatures generated under various simulated environmental settings. The resulting signature matching characteristics determined from such testing may be represented by way of one or more adjustment values. An example of an adjustment value is a scaling factor determined based on a ratio of signature matching attempts versus successful signature matches during a measurement time interval.

In operation, particular reference media content of interest is provided from the CO media library 110 to the reference signature generator 115, which generates one or more reference signatures representative of the particular reference content for storage in the reference signature library 120. The particular reference media content of interest is also provided from the CO media library 110 to the signature tester 125 to generate one or more simulated monitored signatures for use in determining the signature matching capability of the reference media content under a particular simulated operating scenario. The signature tester 125 also to assigns an adjustment value (e.g., such as a scaling factor) to the particular reference media content of interest based on the determined signature matching capability under the particular operating scenario. As discussed in further detail below, the signature tester 125 presents the media content in a controlled (or, in other words, simulated) environment to determine the difficulty of matching monitored signature generated therein with corresponding reference signatures stored in the reference signature library 120.

For instance, the signature tester 125 presents the media content a certain number of times and attempts to match monitored signatures generated for the media content by the signature tester 125 with reference signatures representative of the same content that are stored in the reference signature library 120. By computing the number of times the monitored and reference signatures are determined to match, relative to the total number of signature matches attempted for the measurement interval, the signature tester 125 calculates and assigns a scaling factor to the media content. The scaling factor is a value that indicates, adjusts, and/or scales a number of monitored signatures required to be successfully matched during a measurement interval to consider the monitored media content as having been presented for a sufficient time to be treated as an exposure to a monitored audience member. Media content presented under poor ambient conditions and/or having inherent characteristics that do not lend themselves to producing unique signatures will tend to exhibit poor signature matching results and, thus, can be counted as having been presented with fewer successful matches than for media content having relatively better signature matching capabilities. The scaling factor assigned to the media content is indicative of these and/or other characteristics and, thus, enable the audience measurement entity to more accurately determine the exposure of audience members to monitored media content presentations.

In the illustrated example, the adjustment values (e.g., scaling factors) determined by the signature tester 125 are stored in the adjustment value library 130 for later recall and application to actual signature matching results determined by the signature comparator 135. For example, the adjustment value library 130 can be implemented using any type of storage technology, such as any type of memory, database, etc. Furthermore, any or all of the CO media library 110, the reference signature library 120 and/or the adjustment value library 130 can be implemented using a common storage device (e.g., a common memory unit, database, etc.) For example, a single database may be used to store adjustment values indexed by respective references media content and/or respective reference signatures representative of the reference media content.

Additionally, the signature tester 125 may perform multiple tests on particular reference media content in which each test corresponds to a different simulated environmental configuration setting of the signature tester 125. As described in further detail below, various environmental characteristics can affect a likelihood or ability of a monitored signature to successfully match a corresponding reference signature representative of the same content. Such characteristics include, but are not limited to, a media content playback volume, an ambient noise volume, a media content brightness, an ambient light intensity, etc. To that end, each media content source may have more than one associated adjustment value (e.g., such as one scaling factor for each environment configuration setting).

As indicated by dotted box 170, in at least some example implementations, the receipt of reference content for storage in the CO media library 110, the generation of reference signatures by the reference signature generator 115 and the determination of signature result adjustment values by the signature tester 125 may be performed by the CO 105 off-line prior to processing any monitored signatures received from the monitored sites 160.

The audience measurement equipment in the field (e.g., at an example monitored site 160) records and time stamps collected signatures. The collected signatures are returned to the CO 105. Signature matching results, such as signature matching counts (e.g., the number of signature matches for a given measurement interval during a given period of media content), are then determined by the signature comparator 135 and forwarded to the match rate adjuster 140. The match rate adjuster 140 queries the adjustment value library 130 to retrieve an adjustment value (e.g., a scaling factor) corresponding to the reference content source whose reference signature(s) matched the collected monitored signature(s). Additionally, when a particular reference content source has multiple adjustment values each associated with a different environment configuration setting, the match rate adjuster 140 uses environmental characteristic information provided by the audience measurement equipment in the field to select the adjustment value corresponding to the monitored environmental characteristics.

In the illustrated example, the match rate adjuster 140 applies a retrieved adjustment value (e.g., scaling factor) to the signature matching count (e.g., the number of signature matches counted in the particular measurement interval) for media content monitored in the field (e.g., the monitored sites 160) and saves the resulting revised signature matching count to the reporting data store 145. The revised signature matching count can then be compared to a threshold to determine whether to credit the monitored media content as having been presented and/or consumed. For example, the threshold can correspond to a minimum number of signatures matches that are to occur within a monitored interval of time in order to consider the monitored media content as having been presented and/or consumed.

While an example manner of implementing the CO 105 has been illustrated in FIG. 1, one or more of the elements, processes and/or devices illustrated in FIG. 1 may be combined, divided, re-arranged, omitted, eliminated and/or implemented in any other way. Further, the example CO media library 110, the example reference signature generator 115, the example reference signature library 120, the example signature tester 125, the example adjustment value library 130, the example signature comparator 135, the example match rate adjuster 140, the example reporting data store 145 and/or, more generally, the example CO 105 of FIG. 1 may be implemented by hardware, software, firmware and/or any combination of hardware, software and/or firmware. Thus, for example, any of the example CO media library 110, the example reference signature generator 115, the example reference signature library 120, the example signature tester 125, the example adjustment value library 130, the example signature comparator 135, the example match rate adjuster 140, the example reporting data store 145 and/or, more generally, the example CO 105 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example CO 105, the example CO media library 110, the example reference signature generator 115, the example reference signature library 120, the example signature tester 125, the example adjustment value library 130, the example signature comparator 135, the example match rate adjuster 140 and/or the example reporting data store 145 are hereby expressly defined to include a tangible medium such as a memory, digital versatile disk (DVD), compact disk (CD), etc., storing such software and/or firmware. Further still, the example CO 105 of FIG. 1 may include one or more elements, processes and/or devices in addition to, or instead of, those illustrated in FIG. 1, and/or may include more than one of any or all of the illustrated elements, processes and devices.

Figure 2:
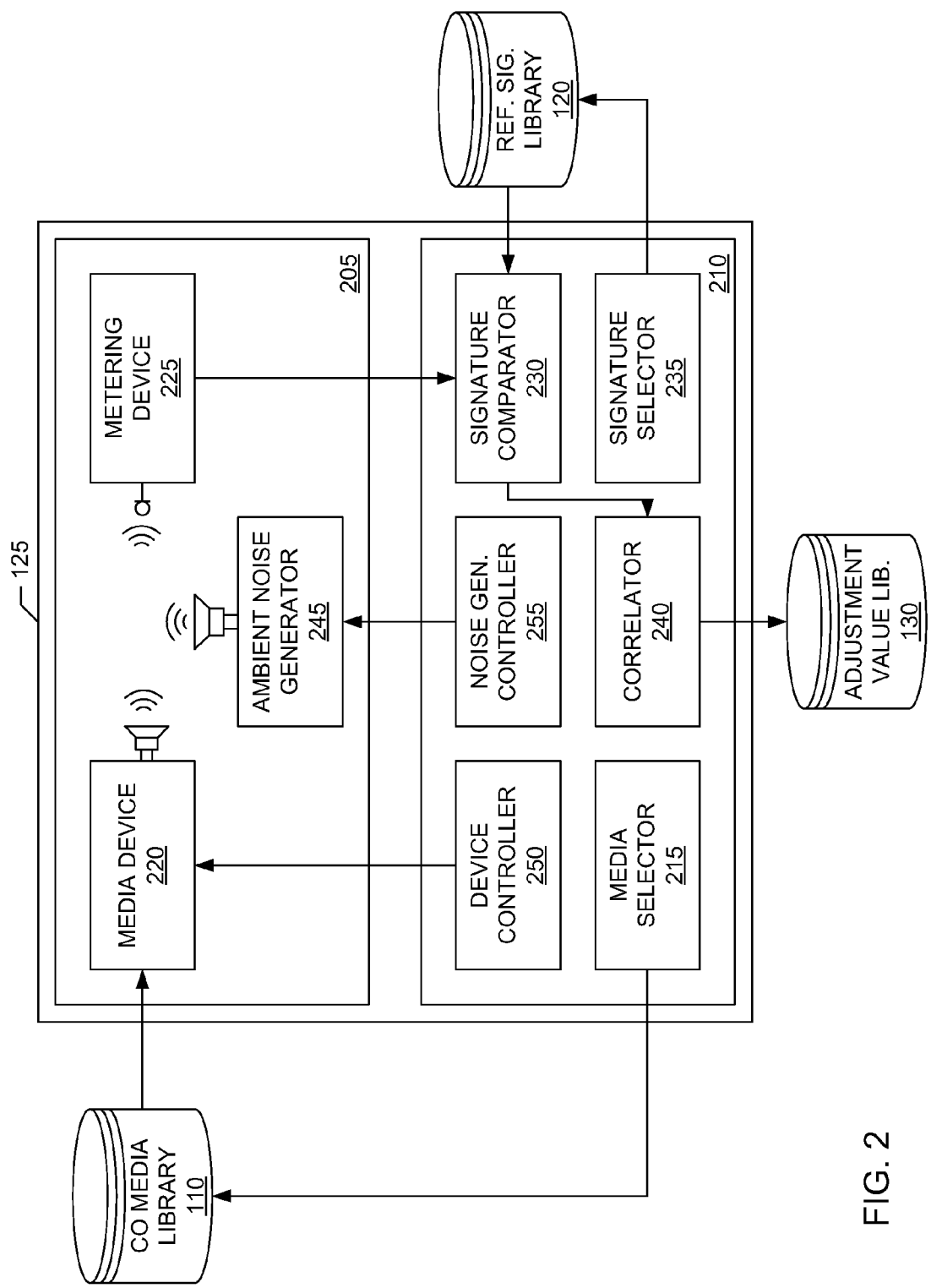
FIG. 2 is a block diagram of a first example signature tester that may be used to implement a portion of the example system of FIG. 1.

FIG. 2 is a block diagram illustrating an example implementation of the example signature tester 125 of FIG. 1. The example signature tester 125 of FIG. 2 is targeted to audio signaturing techniques in which audio signatures are determined (e.g., generated) from inherent characteristics (e.g., frequencies, zero crossings, data patterns, etc.) of an audio signal corresponding to a monitored media content presentation. As described above, the example signature tester 125 calculates scaling factors or, more generally, adjustment values to be applied to signature matching results. In the illustrated example, the signature tester 125 provides a controlled environment 205 in which A/V equipment can present the media content to example audio signature-based audience detection equipment. The example signature tester 125 also includes an evaluation unit 210 to control the configuration settings of the controlled environment 205 and to process the monitored audio signatures generated in the controlled environment 205.

Referring to FIG. 2, the evaluation unit 210 in the signature tester 125 includes a media selector 215 to select reference media content from the CO media library 110 for evaluation. The selected media content is then provided to a media device 220, such as a television and/or a radio, which presents the media content in the controlled environment 205 of the signature tester 125. Multiple types of media devices 220 may be included in the controlled environment 205 to allow testing over the range of media devices expected to be present at the monitored sites 160. A metering device 225 monitors the audio signal(s) emanating from the media device 220 and generates audio signatures from the monitored audio signal(s) using any appropriate audio signaturing technique. The metering device 225 can include any type of audio sensor or interface, such as a microphone, a transducer, a wire, etc., capable of receiving and processing audio signals (e.g., such as in the form of acoustic and/or electrical signals). In the illustrated example, multiple types of metering devices 225 may be included in the controlled environment 205 to allow testing over the range of metering devices expected to be present at the monitored sites 160.

The test (e.g., monitored) audio signatures generated by the metering device 225 are provided to a signature comparator 230, which compares the test (e.g., monitored) audio signatures with reference signatures selected from the reference signature library 120 by a signature selector 235 as representative of the reference media content selected by the media selector 215 during the current measurement time interval. In the illustrated example, signature matching results determined by the signature comparator 230 are provided to a correlator 240. The correlator 240 counts the number of successful signature matches during the measurement interval, and also maintains a count of the total number of test (e.g., monitored) signatures generated during the measurement interval. By determining the number of signature matches and the total number of test (e.g., monitored) signatures generated during the measurement interval, the correlator 240 is able to determine a ratio between the number of generated signatures and the number of successful signature matches. This ratio between the total number of generated signatures and the number of successful signature matches during the measurement interval is used to assign a scaling factor to the signature matching results (e.g., signature matching counts) determined for the reference media content that was selected by the media selector 215 and subjected to the particular configuration of the controlled environment 205. Although in the illustrated example the scaling factor is a ratio, it may be represented in any other desired fashion (e.g., as a difference, etc.). The scaling factors or, more generally, the adjustment values determined by the correlator 240 are stored in the adjustment value library 130.

As described above, more than one scaling factor may be associated with a particular piece of media content. For example, a first scaling factor associated with a particular reference media content source (e.g., such as a particular program or advertisement) may be based on the volume of the audience member's media device, which is modeled in the controlled environment 205 using the media device 220. For example, media content that is presented at a higher volume will likely allow the audience member's metering device, which is modeled in the controlled environment using the metering device 225, to generate audio signatures that are a good proxy of the media content, thereby yielding a high probability of successful signature matches and resulting in a correspondingly lower scaling factor. On the other hand, media content that is presented at a lower volume presents a greater challenge to the metering device 225, thereby resulting in a higher scaling factor. Information relating to volume settings and/or changes (e.g., household environmental conditions) may be detected by the metering device 225 at the monitored site. In the event that metering device 225 can determine that monitored media content is being presented at a particular volume level (e.g., detected via a microphone configured to detect/measure a volume power level in dBm), then a corresponding scaling factor may be selected based on the measured media content presentation volume level and applied when making crediting determinations.

A second example scaling factor associated with a particular reference content source may be based on the ambient noise conditions of the audience member's household. For example, households having loud background noises, such as barking dogs, party activities, and/or other ambient acoustic noise conditions, present greater detection challenges for the metering device 225. As such, a second example scaling factor may be calculated and applied for use when facing such detection challenges. As with the first scaling factor described above, the second scaling factor is based on conditions detected during presentation of the media content at the monitored site. In operation, the reference media content may be associated with multiple scaling factors, each scaling factor associated with a corresponding background noise level (e.g., corresponding to a noise level measured by a microphone in dBm) detected by the metering device 225. Any number of characteristics and/or parameters may play a significant part in the ability of the metering device 225 to generate audio signatures that are good proxies for the monitored media content. Furthermore, depending on the variability of the inherent characteristics of the content itself and/or the environment in which the media content is presented, a relatively large number of permutations of one or more characteristics may result in a large number of potential scaling factors.

To simulate one or more characteristics/parameters that may have an effect on signature matching, the controlled environment 205 of the example signature tester 125 includes an ambient noise generator 245, and the evaluation unit 210 includes a device controller 250 to control the media device 220 and a noise generator controller 255 to control the ambient noise generator 245. In the illustrated example, the device controller 250 configures various settings of the media device 220, including output volume level, output audio tonal characteristics (e.g., treble, bass, equalizer settings, etc.), audio channel settings (e.g., mono, stereo, surround sound, etc.) noise reduction settings, etc. For example, higher output volumes generally correspond to better signature matching results. By varying these settings of the media device 220, a scaling factor may be calculated by the signature tester 125 for each particular device setting. Additionally or alternatively, the noise generator controller 255 configures settings of the ambient noise generator 245, such as volume, tonal characteristics (e.g., such as white noise v. tonal noise), etc., thereby allowing the signature tester 125 to determine corresponding scaling factors when ambient noise is present in the monitored environment.

While an example manner of implementing the signature tester 125 of FIG. 1 has been illustrated in FIG. 2, one or more of the elements, processes and/or devices illustrated in FIG. 2 may be combined, divided, re-arranged, omitted, eliminated and/or implemented in any other way. Further, the example controlled environment 205, the example evaluation unit 210, the example media selector 215, the example media device 220, the example metering device 225, the example signature comparator 230, the example signature selector 235, the example correlator 240, the example ambient noise generator 245, the example device controller 250, the example noise generator controller 255 and/or, more generally, the example signature tester 125 of FIG. 2 may be implemented by hardware, software, firmware and/or any combination of hardware, software and/or firmware. Thus, for example, any of the example controlled environment 205, the example evaluation unit 210, the example media selector 215, the example media device 220, the example metering device 225, the example signature comparator 230, the example signature selector 235, the example correlator 240, the example ambient noise generator 245, the example device controller 250, the example noise generator controller 255 and/or, more generally, the example signature tester 125 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example signature tester 125, the example controlled environment 205, the example evaluation unit 210, the example media selector 215, the example media device 220, the example metering device 225, the example signature comparator 230, the example signature selector 235, the example correlator 240, the example ambient noise generator 245, the example device controller 250 and/or the example noise generator controller 255 are hereby expressly defined to include a tangible medium such as a memory, digital versatile disk (DVD), compact disk (CD), etc., storing such software and/or firmware. Further still, the example signature tester 125 of FIG. 2 may include one or more elements, processes and/or devices in addition to, or instead of, those illustrated in FIG. 2, and/or may include more than one of any or all of the illustrated elements, processes and devices.

Figure 3:
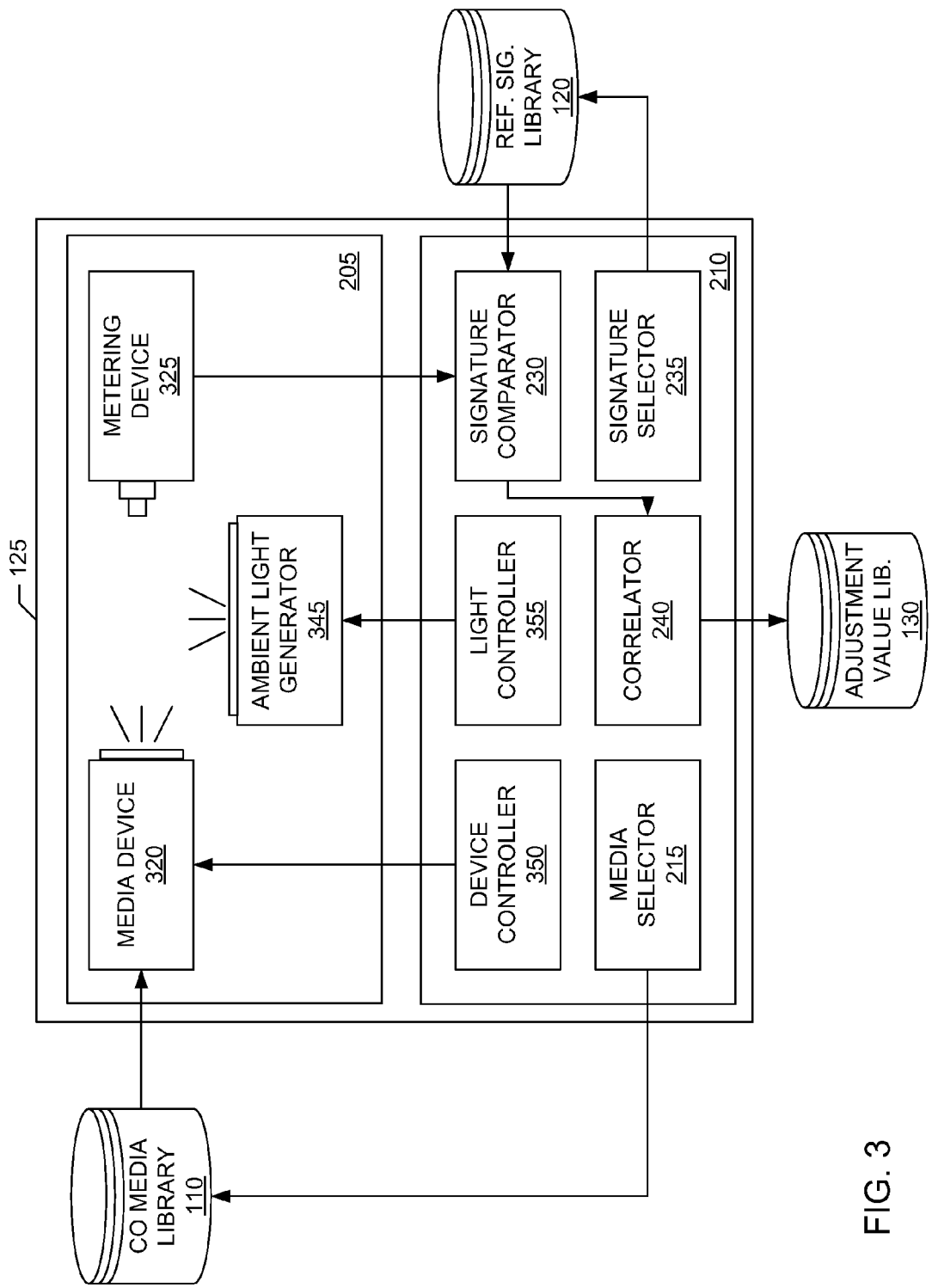
FIG. 3 is a block diagram of a second example signature tester that may be used to implement a portion of the example system of FIG. 1.

A block diagram of a second example implementation of the signature tester 125 of FIG. 1 is illustrated in FIG. 3. The example signature tester 125 of FIG. 3 is targeted to video signaturing techniques in which video signatures are determined (e.g., generated) from inherent characteristics (e.g., frequencies, colors, data patterns, etc.) of a video signal corresponding to a monitored media content presentation. As described above, the example signature tester 125 calculates scaling factors or, more generally, adjustment values to be applied to signature matching results. The example signature tester 125 of FIG. 3 includes many elements in common with the example signature tester 125 of FIG. 2. As such, like elements in FIGS. 2 and 3 are labeled with the same reference numerals. The detailed descriptions of these like elements are provided above in connection with the discussion of FIG. 2 and, in the interest of brevity, are not repeated in the discussion of FIG. 3.

Turning to FIG. 3, the signature tester 125 of the illustrated example includes the controlled environment 205, the evaluation unit 210, the media selector 215, the signature comparator 230, the signature selector 235 and the correlator 240. The operation of these elements is described above in connection with FIG. 2. Similar to the example of FIG. 2, the signature tester 125 of FIG. 3 also includes a media device 320, such as a television and/or a radio, which presents media content selected from the CO media library 110 in the controlled environment 205. As mentioned above, multiple types of media devices 320 may be included in the controlled environment 205 to allow testing over the range of media devices expected to be present at the monitored sites 160.

The controlled environment 205 of the signature tester 125 of FIG. 3 also includes a metering device 325 to monitor the video signal(s) emanating from the media device 320 and generate video signatures from the monitored video signal(s) using any appropriate video signaturing technique. The metering device 325 can include any type of video sensor or interface, such as a camera, a light detector, a wire, etc., capable of receiving and processing video signals (e.g., such as in the form of optical images and/or electrical signals). In the illustrated example, multiple types of metering devices 325 may be included in the controlled environment 205 to allow testing over the range of metering devices expected to be present at the monitored sites 160.

To simulate one or more characteristics/parameters that may have an effect on signature matching, the controlled environment 205 of the example signature tester 125 illustrated in FIG. 3 includes an ambient light generator 345, and the evaluation unit 210 includes a device controller 350 to control the media device 320 and a light generator controller 355 to control the ambient light generator 345. In the illustrated example, the device controller 350 configures various video settings of the media device 320, including output brightness, output contrast, output color settings, output color map, etc. By varying these settings of the media device 320, a scaling factor may be calculated by the signature tester 125 for each particular device setting. Additionally or alternatively, the light generator controller 355 configures settings of the ambient light generator 345, such as intensity and/or spectral characteristics, thereby allowing the signature tester 125 to determine corresponding scaling factors when ambient light is present in the monitored environment.

While an example manner of implementing the signature tester 125 of FIG. 1 has been illustrated in FIG. 3, one or more of the elements, processes and/or devices illustrated in FIG. 3 may be combined, divided, re-arranged, omitted, eliminated and/or implemented in any other way. Further, the example controlled environment 205, the example evaluation unit 210, the example media selector 215, the example media device 320, the example metering device 325, the example signature comparator 230, the example signature selector 235, the example correlator 240, the example ambient light generator 345, the example device controller 350, the example light generator controller 355 and/or, more generally, the example signature tester 125 of FIG. 3 may be implemented by hardware, software, firmware and/or any combination of hardware, software and/or firmware. Thus, for example, any of the example controlled environment 205, the example evaluation unit 210, the example media selector 215, the example media device 320, the example metering device 325, the example signature comparator 230, the example signature selector 235, the example correlator 240, the example ambient light generator 345, the example device controller 350, the example light generator controller 355 and/or, more generally, the example signature tester 125 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example signature tester 125, the example controlled environment 205, the example evaluation unit 210, the example media selector 215, the example media device 320, the example metering device 325, the example signature comparator 230, the example signature selector 235, the example correlator 240, the example ambient light generator 345, the example device controller 350 and/or the example light generator controller 355 are hereby expressly defined to include a tangible medium such as a memory, digital versatile disk (DVD), compact disk (CD), etc., storing such software and/or firmware. Further still, the example signature tester 125 of FIG. 2 may include one or more elements, processes and/or devices in addition to, or instead of, those illustrated in FIG. 2, and/or may include more than one of any or all of the illustrated elements, processes and devices.

Figure 4:
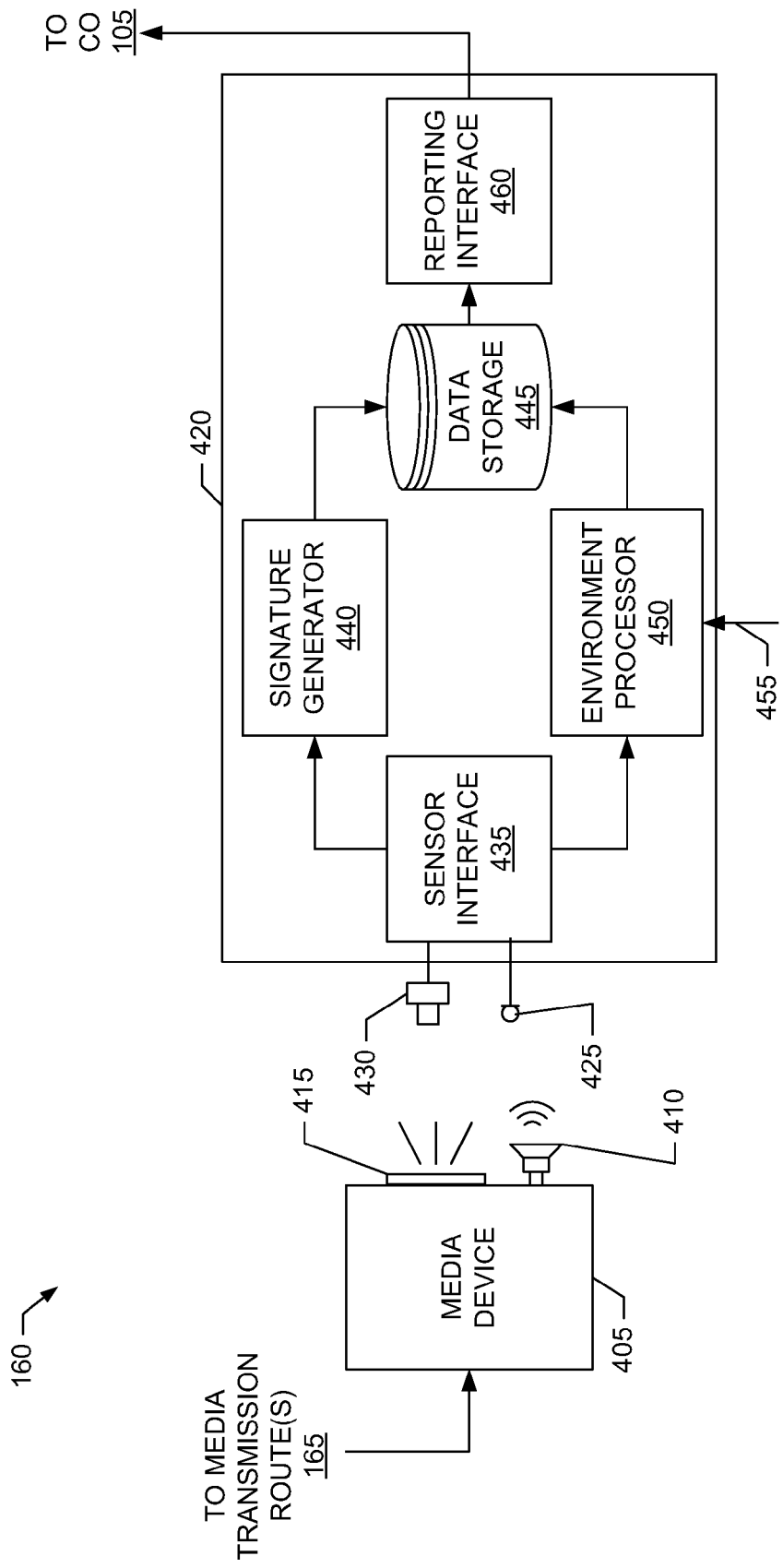
FIG. 4 is a block diagram of an example monitored site including an example monitored media device and an example metering device.

FIG. 4. illustrates an example implementation of one of the example monitored sites 160 of FIG. 1. The example monitored site 160 of FIG. 4 includes a monitored media device 405 communicatively coupled to the media transmission route(s) 165 described above in connection with FIG. 1. As such, the monitored media device 405 is able to receive media content transmitted by via the media transmission route(s) 165 for presentation to audience member(s) at the monitored site 160. In the illustrated example, the monitored media device 405 is capable of presenting multimedia content having audio and/or video components. Therefore, the monitored media device 405 includes an audio output 410, such as a speaker and/or audio line output, and a video output 415, such as any type of video display, video monitor and/or video line output.

The example monitored site 160 of FIG. 4 also includes a metering device 420 to monitor the media signal(s) presented by the monitored media device 405. The metering device 420 may be implemented by a special-purpose fixed or portable meter, or by existing consumer equipment, such as a computer, mobile phone, personal digital assistant (PDA), etc., adapted to implement media metering functionality. In the illustrated example, the metering device 420 includes an audio sensor 425 to monitor audio signals output by the monitored media device 405. The audio sensor 425 may be implemented using any type of audio sensor or audio interface, such as a microphone, a transducer, a wire, etc., capable of receiving and processing audio signals (e.g., such as in the form of acoustic and/or electrical signals). The metering device 420 also includes a video sensor 430 to monitor video signals output by the monitored media device 405. The video sensor 430 may be implemented using any type of video sensor or video interface, such as a camera, a light detector, a wire, etc., capable of receiving and processing video signals (e.g., such as in the form of optical images and/or electrical signals).

The metering device 420 also includes a sensor interface 435 coupled to the audio sensor 425 and the video sensor 430 to convert sensed audio and/or video signals to any appropriate format for processing by a signature generator 440. For example, the sensor interface 435 can be configured to perform signal conditioning, sampling, digital conversion, etc., to obtain audio and/or video digital samples for processing by the signature generator 440. The signature generator 440 implements any appropriate audio and/or video signature generation technique to generate monitored signature(s) representative of the audio and/or video signals sensed by the audio sensor 425 and/or the video sensor 430. As noted above, the audio and/or video signatures generated by the signature generator 440 acts as a substantially unique proxy for the media content being presented by the monitored media device 405. The monitored signatures generated by the signature generator 440 are stored in a data storage unit 445 that can be implemented using any type of storage technology, such as any type of memory, database, etc., for storing signatures according to any appropriate format (e.g., such as data files, waveforms, bitmaps, etc.).

The metering device 420 further includes an environment processor 450 to determine one or more environmental characteristics representative of the environment in which the monitored media device 405 is presenting its media content. In the illustrated example, the environment processor 450 is coupled to the sensor interface 435 and, thus, can measure characteristics of the audio and/or video signals sensed by the audio sensor 425 and/or the video sensor 430, as well as any other emissions or characteristics of the metered environment that the metering device 420 is capable of detecting/measuring. For example, the environment processor 450 can be configured to use any appropriate technique (e.g., such as signal averaging, filtering, etc.) to measure the volume level, ambient noise level, etc., of the audio signal(s) sensed by the audio sensor 425. Additionally or alternatively, the environment processor 450 can be configured to use any appropriate technique (e.g., such as signal averaging, filtering, etc.) to measure the brightness level, ambient light level, etc., of the video signal(s) sensed by the video sensor 430.

Furthermore, the environment processor 450 of the illustrated example includes a configuration input 455 to allow further environmental characteristics to be specified as configuration inputs to the environment processor 450. For example, environmental characteristics such as the type and/or model of the media device 405, one or more configuration settings of the media device 405, the type and/or model of the metering device 420, one or more configuration settings of the metering device 420, etc., can be specified via the configuration input 455. The environmental characteristics determined by the environment processor 450 are stored in the storage unit 445.

To report the collected monitored signatures and environmental characteristics to the CO 105, the example metering device 420 includes a reporting interface 460. The reporting interface 460 can be implemented using any type or reporting and communication/networking technology. As described above, the monitored signatures determined by the metering device 420 are reported to the CO 105 for comparison with reference signatures representative of possible reference media content sources. The media content being monitored by the metering device 420 can then be identified as corresponding to the reference media content source having reference signature(s) substantially matching one or more monitored reference signatures. Additionally, as described above, the environmental characteristics determined and reported by the media device are used to select an appropriate adjustment value (e.g., scaling factor) to be used to adjust or otherwise interpret the signature matching results determined at the CO 105 to account for the variability in matching accuracy caused by different environmental characteristics in which the monitored media content is presented.

While an example manner of implementing the metering device 420 has been illustrated in FIG. 4, one or more of the elements, processes and/or devices illustrated in FIG. 4 may be combined, divided, re-arranged, omitted, eliminated and/or implemented in any other way. Further, the example audio sensor 425, the example video sensor 430, the example sensor interface 435, the example signature generator 440, the example data storage unit 445, the example environment processor 450, the example reporting interface 460 and/or, more generally, the example metering device 420 of FIG. 4 may be implemented by hardware, software, firmware and/or any combination of hardware, software and/or firmware. Thus, for example, any of the example audio sensor 425, the example video sensor 430, the example sensor interface 435, the example signature generator 440, the example data storage unit 445, the example environment processor 450, the example reporting interface 460 and/or, more generally, the example metering device 420 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example metering device 420, the example audio sensor 425, the example video sensor 430, the example sensor interface 435, the example signature generator 440, the example data storage unit 445, the example environment processor 450 and/or the example reporting interface 460 are hereby expressly defined to include a tangible medium such as a memory, digital versatile disk (DVD), compact disk (CD), etc., storing such software and/or firmware. Further still, the example metering device 420 of FIG. 4 may include one or more elements, processes and/or devices in addition to, or instead of, those illustrated in FIG. 4, and/or may include more than one of any or all of the illustrated elements, processes and devices.

With reference to the example signature tester 125 of FIG. 2, FIG. 5 illustrates an example table 500 of signature matching results generated by the example correlator 240 for use in determining signature matching adjustment values (e.g., scaling factors). The example table 500 includes a content identification column 505 to identify which particular reference content source corresponds to each stored signature matching result, a characteristic column 510 to describe which one or more environmental characteristics were measured, a characteristic value column 515, a number of signatures compared column 520, a number of signatures matched column 525, and a matching ratio column 530. The example table 500 illustrates signature matching results 535 for content ID #1 corresponding to different environmental characteristics including different combinations of volume levels and ambient noise levels. The example table 500 also illustrates signature matching results 540 for content ID #2 corresponding to different environment characteristics including different combinations of volume levels and ambient noise levels. For example, the table 500 indicates that, for a volume level of 30 dB and an ambient noise level of 30 dB, six out of ten signature matching results were successful for the reference content having a content ID of 1, whereas five out of ten signature matching results were successful for the reference content having a content ID of 2.

Although not depicted in the example of FIG. 5, the table 500 can include signature matching results for any other environmental characteristic of interest, such as the type and/or model of the monitored media device, one or more configuration settings of the monitored media device (e.g., such as output volume level, output audio tonal and/or channel settings, noise reduction settings, output video brightness, output video contrast, etc.), the type and/or model of the metering device itself, one or more configuration settings of the metering device (e.g., such as audio and/or video sensor input gains and/or conditioning settings, audio and/or video sensor sampling rates and/or resolutions, etc.), etc. As described above, the signature tester 125 evaluates signature matching results for one or more permutations of the environmental characteristics of interest to establish corresponding scaling factors. As discussed above, such scaling factors may be applied to the signature matching results obtained for monitored media content based on, for example, the measured environmental characteristics (e.g., the audience member's television volume level in decibels and/or the audience member's ambient noise level in decibels) reported by the metering device located at a particular monitored site 160.

Although not illustrated in the figures, for the case of video signature processing, the example signature tester 125 of FIG. 3 could generate a table similar to table 500, but with the volume level and ambient noise characteristics replaced by brightness and ambient light characteristics, respectively.

FIGS. 6A, 6B, and 6C illustrate example scaling factor calculations that can be performed by the example signature tester of FIGS. 2 and/or 3. While the example scaling factor calculations may be based on the data acquired by the correlator 240 as shown in the example table 500 of FIG. 5, the example values shown in FIGS. 6A, 6B, and 6C are unrelated to the example data shown in FIG. 5. Instead, the example values shown in FIG. 6A illustrate example upper and lower signature matching capabilities for one or more reference media content sources. In particular, FIG. 6A illustrates an example seven-way categorization of reference media content according to signature matching rates 600 ranging from category "A", representing the highest average signature matching rates (i.e., reference content in which the monitored and reference signature were most successfully matched by the signature tester 125), to category "G" for the lowest signature matching rates. In the illustrated example, reference content in category "A" exhibited signature matching results in the controlled environment 205 of the signature tester 125 no less than 91% under some set of environment parameters. By contrast, reference content category "G" exhibited signature matching results in the controlled environment 205 of the signature tester 125 that were less than 60% under some set of environment parameters. More or fewer categories may be employed, as needed.

In the illustrated example, scaling factors are calculated based on this empirical range of signature matching capabilities. Scaling factors 605 of FIG. 6B are normalized to category "A," and are based on dividing the most successful category (i.e., category "A" having a minimum signature matching rate of 0.91) by each individual category. As such, the scaling factor for category "F" is based on dividing 0.91 by 0.60, the scaling factor for category "E" is based on dividing 0.91 by 0.70, the scaling factor for category "D" is based on dividing 0.91 by 0.80, the scaling factor for category "C" is based on dividing 0.91 by 0.85, the scaling factor for category "B" is based on dividing 0.91 by 0.87, and the scaling factor for category "A" is based on dividing 0.91 by 0.91. The scaling factor for category "G" is set to any value greater than the scaling factor for category "F," such as a scaling value determined via testing that, when used to scale actual matching rates, yields an accurate adjusted (or corrected) matching rate over the reference content included in category "G."

Without limitation, the scaling factors may be calculated with additional and/or alternate mathematical approaches. For example, scaling factors 610 of FIG. 6C are normalized to 100%, and are based on dividing the value 1.00 by each corresponding category average. As such, in FIG. 6C the scaling factor for category "A" is based on dividing 1.00 by 0.91, the scaling factor for category "B" is based on dividing 1.00 by 0.87, the scaling factor for category "C" is based on dividing 1.00 by 0.85, the scaling factor for category "D" is based on dividing 1.00 by 0.80, the scaling factor for category "E" is based on dividing 1.00 by 0.70, and the scaling factor "F" is based on dividing 1.00 by 0.60. The scaling factor for category "G" is set to any value greater than the scaling factor for category "F," such as a scaling value determined via testing that, when used to scale actual matching rates, yields an accurate adjusted (or corrected) matching rate over the reference content included in category "G." Upon completion of calculating scaling factors, the correlator 240 of the signature tester 125 forwards the scaling factors to the adjustment value library 130 so that such factors may be applied to audience data received from the monitored sites 160.

Flowcharts representative of example machine readable instructions for implementing any of the example systems of FIGS. 1-4, as well as any or all of the example system 100, the example CO 105, the example CO media library 110, the example reference signature generator 115, the example reference signature library 120, the example signature tester 125, the example adjustment value library 130, the example signature comparator 135, the example match rate adjuster 140, the example reporting data store 145, the example controlled environment 205, the example evaluation unit 210, the example media selector 215, the example media device 220, the example metering device 225, the example signature comparator 230, the example signature selector 235, the example correlator 240, the example ambient noise generator 245, the example device controller 250, the example noise generator controller 255, the example media device 320, the example metering device 325, the example ambient light generator 345, the example device controller 350, the example light generator controller 355, the example metering device 420, the example audio sensor 425, the example video sensor 430, the example sensor interface 435, the example signature generator 440, the example data storage unit 445, the example environment processor 450 and/or the example reporting interface 460 are shown in FIGS. 7A-B, 8 and 9. In the illustrated examples, the machine readable instructions comprise a program or programs for execution by: (a) a processor such as the processor 1012 shown in the example computer 1000 discussed below in connection with FIG. 10, (b) a controller, and/or (c) any other suitable processing device. The program or programs may be embodied in software stored on a tangible medium such as, for example, a flash memory, a CD-ROM, a floppy disk, a hard drive, a digital versatile disk (DVD), or a memory associated with the processor 1012, but the entire program and/or parts thereof could alternatively be executed by a device other than the processor 1012 and/or embodied in firmware or dedicated hardware (e.g., it may be implemented by an application specific integrated circuit (ASIC), a programmable logic device (PLD), a field programmable logic device (FPLD), discrete logic, etc.). Also, some or all of the machine readable instructions represented by the flowcharts of FIGS. 7A-B, 8 and 9 may be implemented manually. Further, although the example machine readable instructions are described with reference to the flowcharts illustrated in FIGS. 7A-B, 8 and 9, many other methods of implementing the example machine readable instructions may alternatively be used. For example, the order of execution of the blocks may be changed, and/or some of the blocks described may be changed, substituted, eliminated, or combined and/or subdivided into multiple blocks.

Figure 7A:
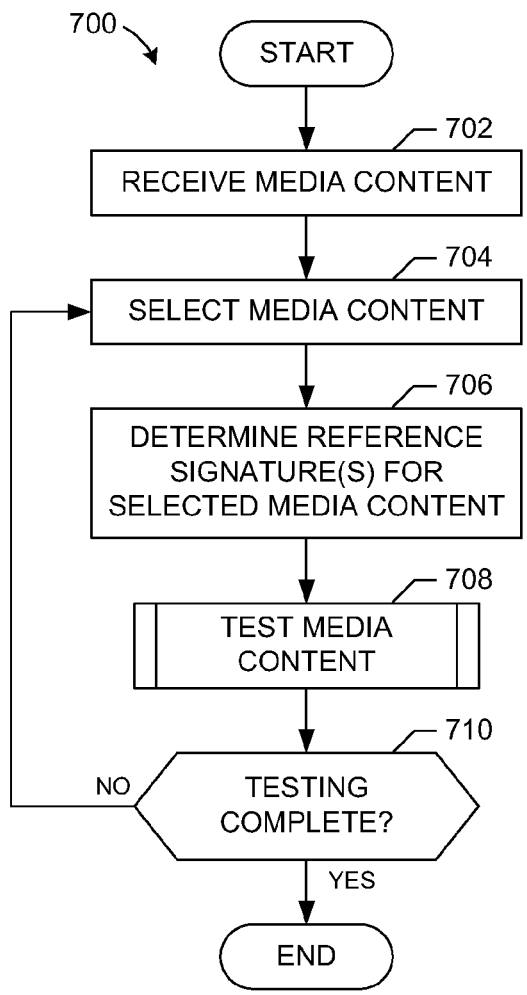
FIGS. 7A-B, 8 and 9 illustrate flowcharts representative of example processes that may be executed to implement the example system of FIG. 1, the example signature testers of FIGS. 2 and/or 3, and/or the example monitored site of FIG. 4.
Figure 7B:
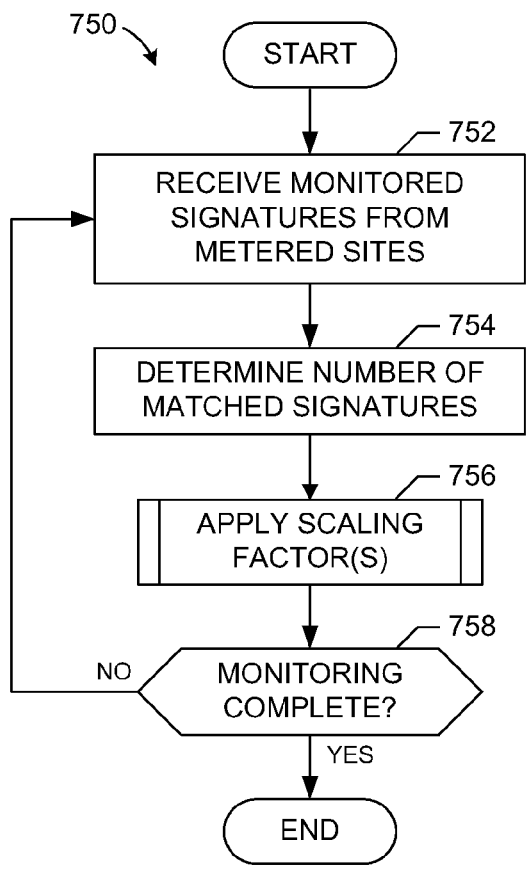

FIGS. 7A-B are flowcharts representative of processes, which may be implemented using machine readable instructions 700 and 750, to perform signature-based media content identification to facilitate audience measurement. With reference to FIGS. 1-4, the example machine readable instructions 700 of FIG. 7A operate to determine the signature matching characteristics of reference media content and begin execution at block 702 where the CO 105 receives reference media content to be used to perform signature-based media content identification for audience measurement. At block 702, the CO 105 may receive the reference media content from the broadcast media library 150 for storage in the received content in the CO media library 110. Next, control proceeds to block 704 at which the media selector 215 of the CO 105 selects media content from the CO media library 110 that has not yet been analyzed for signature matching effectiveness.

Figure 8:
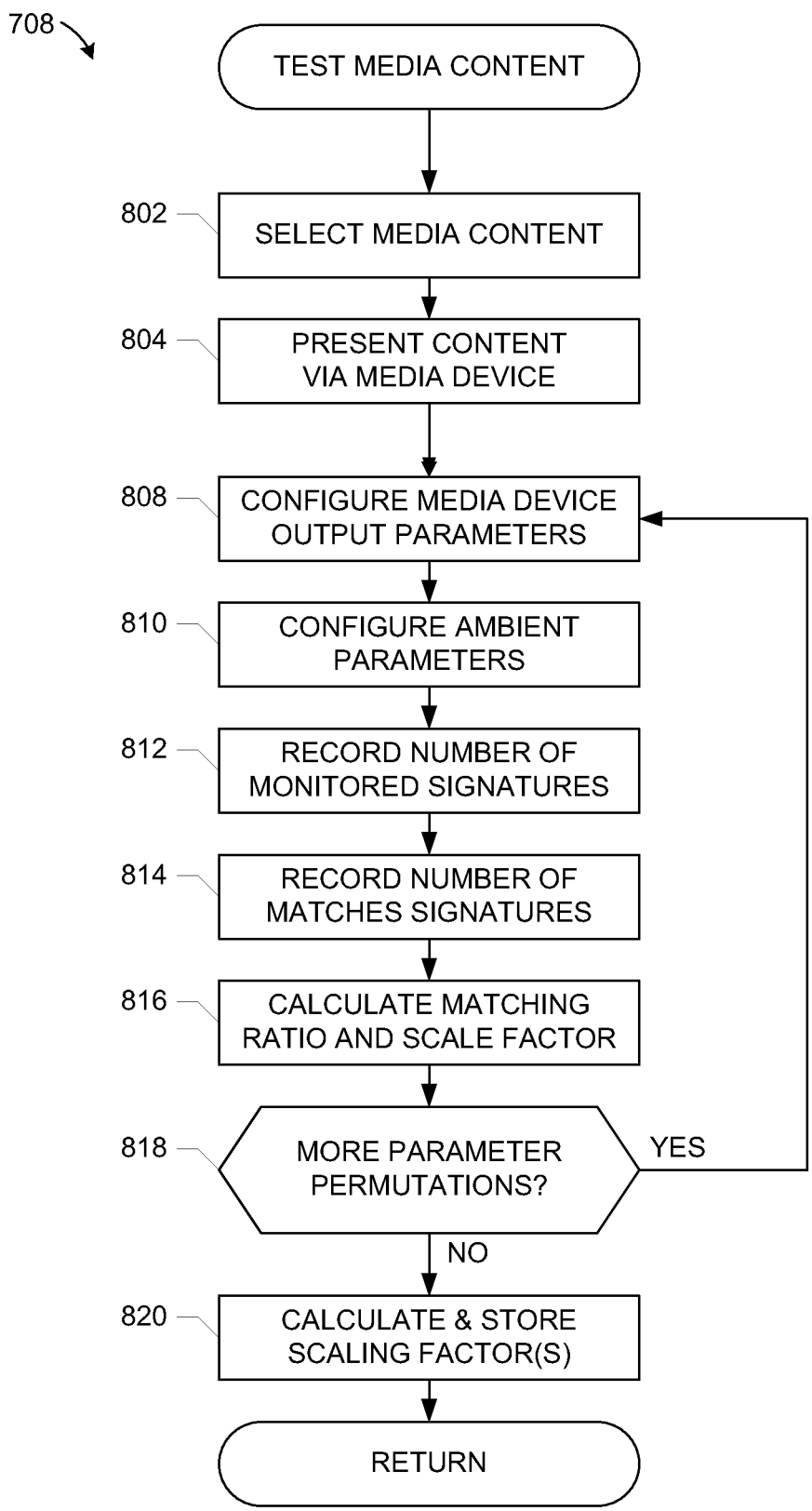

Next, control proceeds to block 706 at which the reference signature generator 115 included in the CO 105 generates one or more reference signatures for the reference media content selected at block 704 and stores the generated reference signature(s) in the reference signature library 120. For example, at block 706 the reference signature generator 115 may use any appropriate signature generation technique to generate one or more audio signatures and/or one or more video signatures to represent the reference media content selected at block 706. Then, at block 708 the signature tester 125 included in the example CO 105 tests the signature matching capability of the reference media content selected at block 704 using the reference signature(s) determined at block 706 to determine one or more scaling factors or, more generally, one or more adjustment values based on the signature matching capabilities of the selected reference content under one or more configured environment conditions. As discussed in further detail below, at block 708 the tested reference content source is associated with one or more scaling factors to be used to adjust signature matching results arising from the matching of monitored signatures with reference signatures representative of the tested reference content. Example machine readable instructions that may be used to implement the processing at block 708 are illustrated in FIG. 8 and described in greater detail below.

After processing at block 708 completes, control proceeds to block 710 at which the CO 105 determines whether signature testing of the reference content sources is complete. If signature testing is not complete (block 710), control returns to block 704 and blocks subsequent thereto at which another reference content source is selected for signature testing. However, if signature testing is complete (block 710), execution of the example machine readable instructions 700 ends.

Turning to FIG. 7B, the example machine readable instructions 750 perform signature-based media content identification using the signature matching characteristics determined by the example machine instructions 700 of FIG. 7A. With reference to FIGS. 1-4, the example machine readable instructions 750 of FIG. 7B begin execution at block 752 at which the signature comparator 135 included in the CO 105 receives monitored signatures from one or more monitored sites 160. For example, at block 752 the signature comparator 135 receives the monitored audio and/or video signatures from one or more monitored sites 160. Then, at block 754 the signature comparator 135 compares the received monitored signatures with reference signatures retrieved from the reference signature library 120. Additionally, at block 754 the signature comparator 135 counts the number of signature matches that occur during each specified measurement interval. As described above, the monitored media content is identified as corresponding to a particular reference content source during a particular measurement interval when the monitored signature(s) for that interval substantially match the reference signature(s) representative of that reference content. As such, a count of the number of signature matches during a measurement interval can be used to determine whether sufficient signature matches have occurred to reliably identify the monitored media content as corresponding to the particular reference media content. Additionally or alternatively, the count of the number of signature matches during a measurement interval can be used to determine whether the monitored media content was presented long enough to be considered as having been exposed to the audience member.

Figure 9:
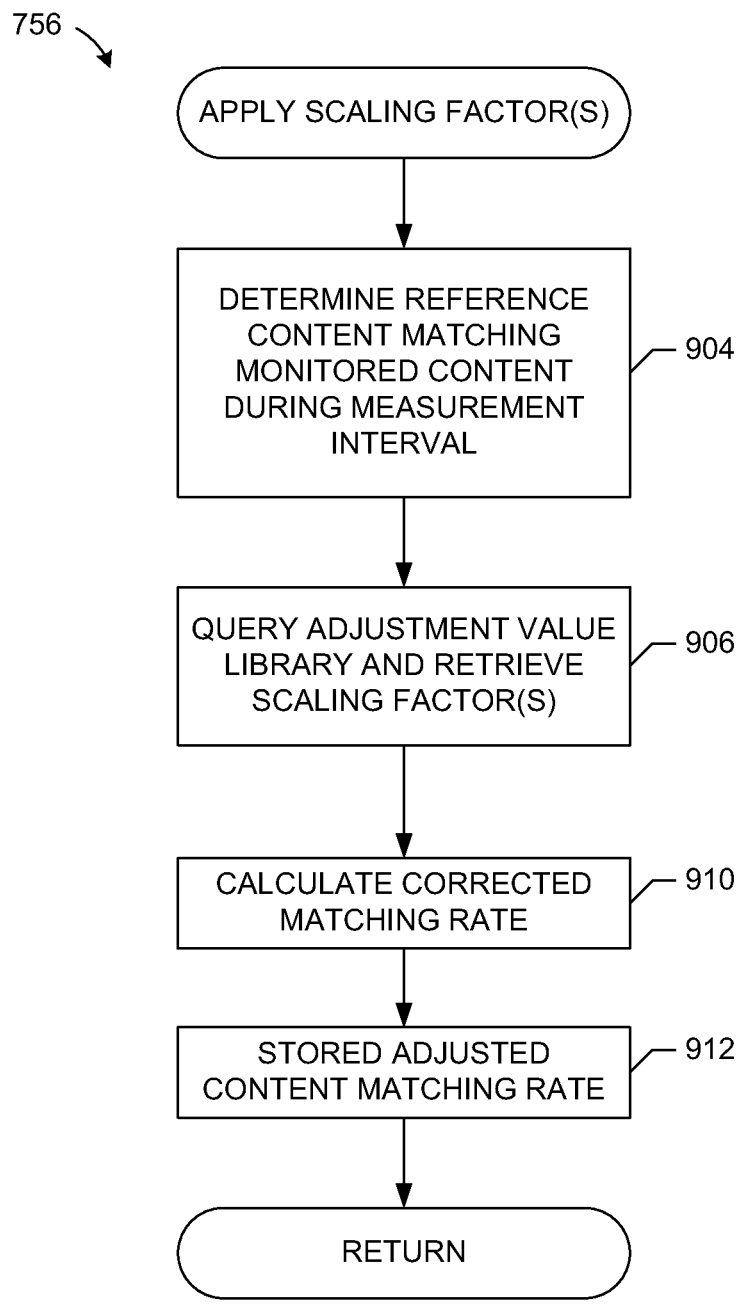

Next, control proceeds to block 756 at which the match rate adjuster 140 included in the CO 105 retrieves one or more scaling factors or, more generally, adjustment values to be applied to the signature matching count(s) determined at block 754. For example, at block 756 the match rate adjuster 140 uses environmental characteristic information also received at block 752 from the monitored site(s) to retrieve the scaling factor determined at block 708 corresponding to the monitored environmental characteristics. The match rate adjuster 140 applies the retrieved scaling factor to the signature matching count (e.g., the number of signature matches counted in the particular measurement interval) determined at block 754 and stores the result as a revised signature matching result in the reporting data store 145 included in the CO 105. Example machine readable instructions that may be used to implement the processing at block 756 are illustrated in FIG. 9 and described in greater detail below.

After processing at block 756 completes, control proceeds to block 758 at which the CO 105 determines whether media content monitoring is complete. If monitoring is not complete (block 758), control returns to block 752 and blocks subsequent thereto at which the CO receives additional monitored signatures, as well as monitored environmental characteristics, from the monitored sites 160. However, if monitoring is complete (block 758), execution of the example machine readable instructions 700 ends.

FIG. 8 illustrates example machine readable instructions 708 that may be executed to implement the signature testing performed at block 708 of FIG. 7A. In the illustrated example of FIG. 8, execution of the example machine readable instructions 708 begins at block 802 at which the signature tester 125 selects a particular reference content source from the CO media library 110 using the media selector 215. Next, control proceeds to block 804 at which the selected reference content is presented in the controlled environment 205 on the media device 220 or 320. Next, at block 808 the signature tester 125 configures a volume level of the media device 220 via the device controller 250. Then, at block 810 the signature tester 125 configures ambient noise parameters of the ambient noise generator 245 via the noise generator controller 255. Additionally or alternatively, at blocks 808 and 810 the signature tester 125 may configure a brightness and/or contrast of the media device 320 via the device controller 350, as well as configuring ambient light parameters of the ambient light generator 345 via the light generator controller 355.

Next, at block 812 the correlator 240 records the number of monitored signatures generated by the metering device 225 or 325 included in the controlled environment 205 during a current measurement interval. Next, at block 814 the correlator 240 determines a number of signature matches between corresponding monitored and reference signatures compared by the signature comparator 230 during the current measurement interval. Then, at block 816 the correlator 240 uses the number of signatures matches and the total number of signatures generated to calculate a signature matching ratio for the particular configured environment conditions. Additionally, at block 816 a scale factor is determined based on the signature matching ratio as described above in connection with FIGS. 5 and 6A-6C.

In the event that additional variations of parameters are needed and/or desired to accommodate alternate conditions in which media content may be presented to audience measurement equipment, at block 818 the example signature tester 125 determines whether additional signature testing is to be performed. If more configuration parameters are to be tested (block 818), control returns to block 808 and blocks subsequent thereto to re-configure such parameters before calculating additional signature matching ratios and corresponding scale factors. However, if no more configuration parameters are to be tested (block 818), control proceeds to block 820 at which the calculated scaling factors are stored in the adjustment value library 130 of the CO 105. Execution of the example machine readable instructions 708 of FIG. 8 then ends.

FIG. 9 illustrates example machine readable instructions 756 that may be executed to implement the application of scaling factors at block 756 of FIG. 7B. Execution of the example machine readable instructions 756 of FIG. 9 begins at block 904 at which the example signature comparator 135 included in the CO 105 identifies the reference content having reference signature(s) that matched the received monitored signature(s) representative of the media content monitored at a monitored site 160. Control then proceeds to block 906 at which the match rate adjuster 140 of the CO 105 queries the adjustment value library 130 and obtains the scaling factor(s) associated with the matching reference content identified at block 904 and associated with the environmental characteristics reported from the monitored site 160. Then, at block 910 a corrected signature matching rate is calculated by the match rate adjuster 140 using the scaling factors obtained from the adjustment value library 130 at block 908. For example, at block 910 the match rate adjuster 140 can use a scale factor associated with the identified reference content and measured environmental characteristics to scale the raw signature matching rate calculated by the signature comparator 135 of the CO 105. Then, at block 912 the match rate adjuster 140 stores the adjusted signature matching result determined at block 910 in the reporting data store 145 included in the CO 105. As described above in greater detail, the adjusted, or revised, signature matching result stored at block 912 can be compared to one or more thresholds to determine whether to credit the monitored media content as having been presented and/or consumed.

Figure 10:
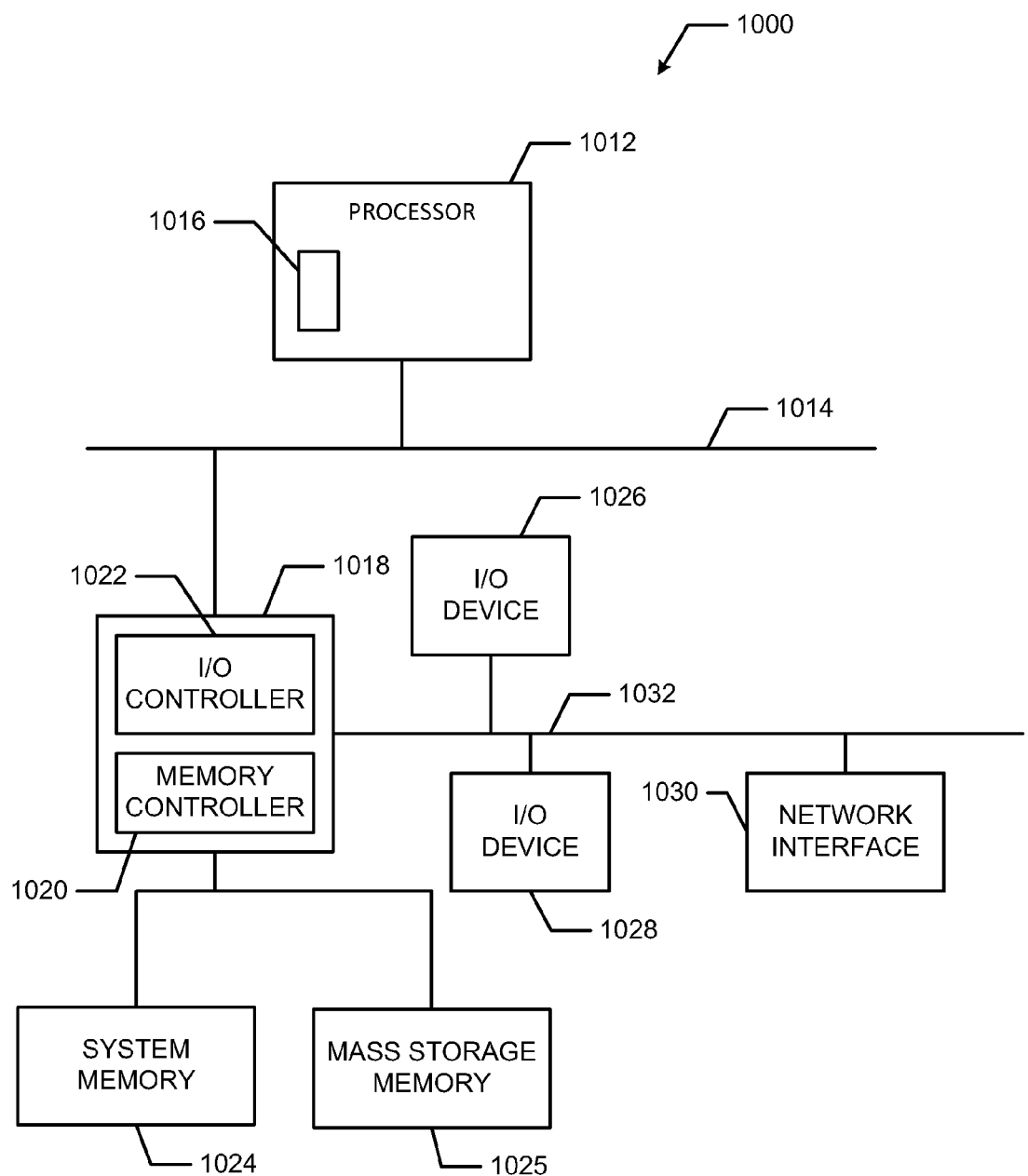
FIG. 10 is a block diagram of an example processor system that may execute machine readable instructions implementing the processes of FIGS. 7A-B, 8 and 9 to implement the example system of FIG. 1, the example signature testers of FIGS. 2 and/or 3, and/or the example monitored site of FIG. 4.

FIG. 10 is a block diagram of an example processor system that may be used to execute some or all of the example machine readable instructions of FIGS. 7A-B, 8 and/or 9 to implement the example systems and/or methods described herein. As shown in FIG. 10, the processor system 1000 includes a processor 1012 that is coupled to an interconnection bus 1014. The processor 1012 includes a register set or register space 1016, which is depicted in FIG. 10 as being entirely on-chip, but which could alternatively be located entirely or partially off-chip and directly coupled to the processor 1012 via dedicated electrical connections and/or via the interconnection bus 1014. The processor 1012 may be any suitable processor, processing unit or microprocessor. Although not shown in FIG. 10, the system 1000 may be a multi-processor system and, thus, may include one or more additional processors that are identical or similar to the processor 1012 and that are communicatively coupled to the interconnection bus 1014.

The processor 1012 of FIG. 10 is coupled to a chipset 1018, which includes a memory controller 1020 and an input/output (I/O) controller 1022. As is well known, a chipset typically provides I/O and memory management functions as well as a plurality of general purpose and/or special purpose registers, timers, etc. that are accessible or used by one or more processors coupled to the chipset 1018. The memory controller 1020 performs functions that enable the processor 1012 (or processors if there are multiple processors) to access a system memory 1024 and a mass storage memory 1025.

The system memory 1024 may include any desired type of volatile and/or non-volatile memory such as, for example, static random access memory (SRAM), dynamic random access memory (DRAM), flash memory, read-only memory (ROM), etc. The mass storage memory 1025 may include any desired type of mass storage device including hard disk drives, optical drives, tape storage devices, etc.

The I/O controller 1022 performs functions that enable the processor 1012 to communicate with peripheral input/output (I/O) devices 1026 and 1028 and a network interface 1030 via an I/O bus 1032. The I/O devices 1026 and 1028 may be any desired type of I/O device such as, for example, a keyboard, a video display or monitor, a mouse, etc. The network interface 1030 may be, for example, an Ethernet device, an asynchronous transfer mode (ATM) device, an 802.11 device, a digital subscriber line (DSL) modem, a cable modem, a cellular modem, etc. that enables the processor system 1000 to communicate with another processor system.

While the memory controller 1020 and the I/O controller 1022 are depicted in FIG. 10 as separate functional blocks within the chipset 1018, the functions performed by these blocks may be integrated within a single semiconductor circuit or may be implemented using two or more separate integrated circuits.

As an alternative to implementing the methods and/or apparatus described herein in a system such as the device of FIG. 10, the methods and or apparatus described herein may be embedded in a structure such as a processor and/or an ASIC (application specific integrated circuit).

Although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method for monitoring a media presentation, the method comprising:
   obtaining, from a monitoring device, a first signature representative of the monitored media presentation;
   obtaining, from the monitoring device, an environmental characteristic associated with the first signature; and
   adjusting a signature matching rate, which corresponds to a number of times signatures obtained from the monitoring device are determined to match corresponding reference signatures representative of first reference media during a measurement time interval, using a first adjustment value when the first signature is determined to match a first reference signature representative of the first reference media, the first adjustment value being selected from a plurality of adjustment values based on the matched first reference media and the environmental characteristic.

2. A method as defined in claim 1 wherein the environmental characteristic includes at least one of a volume level or an ambient noise level measured by the monitoring device.

3. A method as defined in claim 1 wherein the environmental characteristic includes information descriptive of at least one of the monitoring device, a configuration of the monitoring device, a media device presenting the monitored media presentation or a configuration of the media device.

4. A method as defined in claim 1 wherein adjusting the signature matching rate includes scaling the signature matching rate by the first adjustment value.

5. A method as defined in claim 1 further including selecting the first adjustment value from a set of adjustment values associated with the first reference media, each adjustment value in the set of adjustment values being associated with a respective one or a respective combination of environmental characteristics.

6. A method for monitoring a media presentation, the method comprising:
   presenting reference media in a controlled environment having a first configuration setting from a plurality of possible configuration settings;
   determining a set of test signatures by monitoring the presentation of the reference media in the controlled environment;
   counting a number of successful matches between the set of test signatures and a respective set of reference signatures representative of the reference media to determine an adjustment value;
   storing the adjustment value in memory for subsequent selection to adjust a signature matching result, the adjustment value to be selected when an environmental characteristic associated with a first signature representative of the monitored media presentation corresponds to the first configuration setting;
   obtaining, from a monitoring device, the first signature representative of the monitored media presentation;
   obtaining, from the monitoring device, the environmental characteristic associated with the first signature; and
   adjusting the signature matching result using the adjustment value when the first signature is determined to match a reference signature representative of the reference media, the adjustment value being selected from a plurality of adjustment values based on the matched reference signature and the environmental characteristic.

7. A method as defined in claim 6 wherein the first configuration setting corresponds to a first volume setting of a media device included in the controlled environment to present the reference media and a first ambient noise setting of an ambient noise generator included in the controlled environment.

8. A tangible machine readable storage device or storage disk comprising machine readable instructions which, when executed, cause a machine to at least:
adjust a signature matching rate using a first adjustment value when a first signature representative of a monitored media presentation is determined to match a first reference signature representative of first reference media, the first adjustment value being selected from a plurality of adjustment values based on the matched first reference media and an environmental characteristic associated with the first signature representative of the monitored media presentation, the signature matching rate corresponding to a number of times signatures representative of the monitored media presentation are determined to match corresponding reference signatures representative of the first reference media during measurement time interval.

9. A storage device or storage disk as defined in claim 8 wherein the environmental characteristic includes at least one of a volume level or an ambient noise level measured by a monitoring device.

10. A storage medium device or storage disk as defined in claim 8 wherein the environmental characteristic includes information descriptive of at least one of a monitoring device, a configuration of the monitoring device, a media device presenting the monitored media presentation or a configuration of the media device.

11. A tangible machine readable storage device or storage disk comprising machine readable instructions which, when executed, cause a machine to at least:
present reference media in a controlled environment having a first configuration setting from a plurality of possible configuration settings;
determine a set of test signatures by monitoring the presentation of the reference media in the controlled environment;
count a number of successful matches between the set of test signatures matches and a respective set of reference signatures representative of the reference media to determine an adjustment value; and
store the adjustment value in memory for subsequent selection to adjust a signature matching result, the adjustment value to be selected when an environmental characteristic associated with a first signature representative of a monitored media presentation corresponds to the first configuration setting; and
adjust the signature matching result using the adjustment value when a first signature representative of the monitored media presentation is determined to match a reference signature representative of reference media, the adjustment value being selected from a plurality of adjustment values based on the matched reference signature and the environmental characteristic associated with the first signature.

12. An apparatus to adjust a signature matching rate associated with monitoring a media presentation, the apparatus comprising:
a signature comparator to compare a first signature representative of the monitored media presentation with a plurality of reference signatures representative of a plurality of reference media sources; and
a match rate adjuster to adjust the signature matching rate using a first adjustment value when the first signature is determined to match a reference signature representative of a first reference media source from the plurality of reference media sources, the signature matching rate being representative of a frequency with which reference signatures representative of the first reference media source are successfully matched during a measurement time interval, the first adjustment value being selected based on the matched reference signature and a first environmental characteristic associated with the first signature, the first environmental characteristic and the first signature being obtained from a same monitoring device.

13. An apparatus as defined in claim 12 wherein the first environmental characteristic includes at least one of a volume level or an ambient noise level measured by the monitoring device.

14. An apparatus as defined in claim 12 wherein the first environmental characteristic includes information descriptive of at least one of the monitoring device, a configuration of the monitoring device, a media device presenting the monitored media presentation or a configuration of the media device.

15. An apparatus as defined in claim 12 wherein the signature matching rate is a first signature matching rate, and the match rate adjuster is to further adjust a second signature matching rate using a second adjustment value when a second signature obtained from the monitoring device is determined to match a second reference signature representative of a second reference media source, the second adjustment value being selected based on the matched second reference signature and a second environmental characteristic associated with the second signature obtained from the monitoring device, the second environmental characteristic being obtained from the monitoring device.

16. An apparatus as defined in claim 15 wherein the first environmental characteristic corresponds to at least one of a first volume level or a first ambient noise level, and the second environmental characteristic corresponds to at least one of a second volume level or a second ambient noise level.

17. An apparatus as defined in claim 12 further including memory to store a plurality of adjustment values corresponding to the plurality of reference signatures and to a plurality of environmental characteristics, each adjustment value associated with a respective reference signature and a respective combination of environmental characteristics.

18. An apparatus as defined in claim 12 further including a signature tester to:
present the first reference media source in a controlled environment having a first configuration setting from a plurality of possible configuration settings;
determine a first set of test signatures by monitoring the presentation of the first reference media source in the controlled environment;
determine a first ratio of a number of successful matches of the first set of test signatures with a respective set of reference signatures representative of the first reference media source to a total size of the first set of test signatures to determine the first adjustment value; and
store the first adjustment value in memory for subsequent selection to adjust the signature matching rate, the first adjustment value to be selected when the first environmental characteristic corresponds to the first configuration setting.

19. An apparatus as defined in claim 18 wherein the signature tester is further to:
- present the first reference media source in the controlled environment having a second configuration setting from the plurality of possible configuration settings;
- determine a second set of test signatures by monitoring the presentation of the first reference media source in the controlled environment;
- determine a second ratio of a number of successful matches of the second set of test signatures matches with the respective set of reference signatures representative of the first reference media source to a total size of the second set of test signatures to determine a second adjustment value; and
- scale the first adjustment value by the second adjustment value before storing the first adjustment value in memory.

* * * * *